Figures 1, 2:
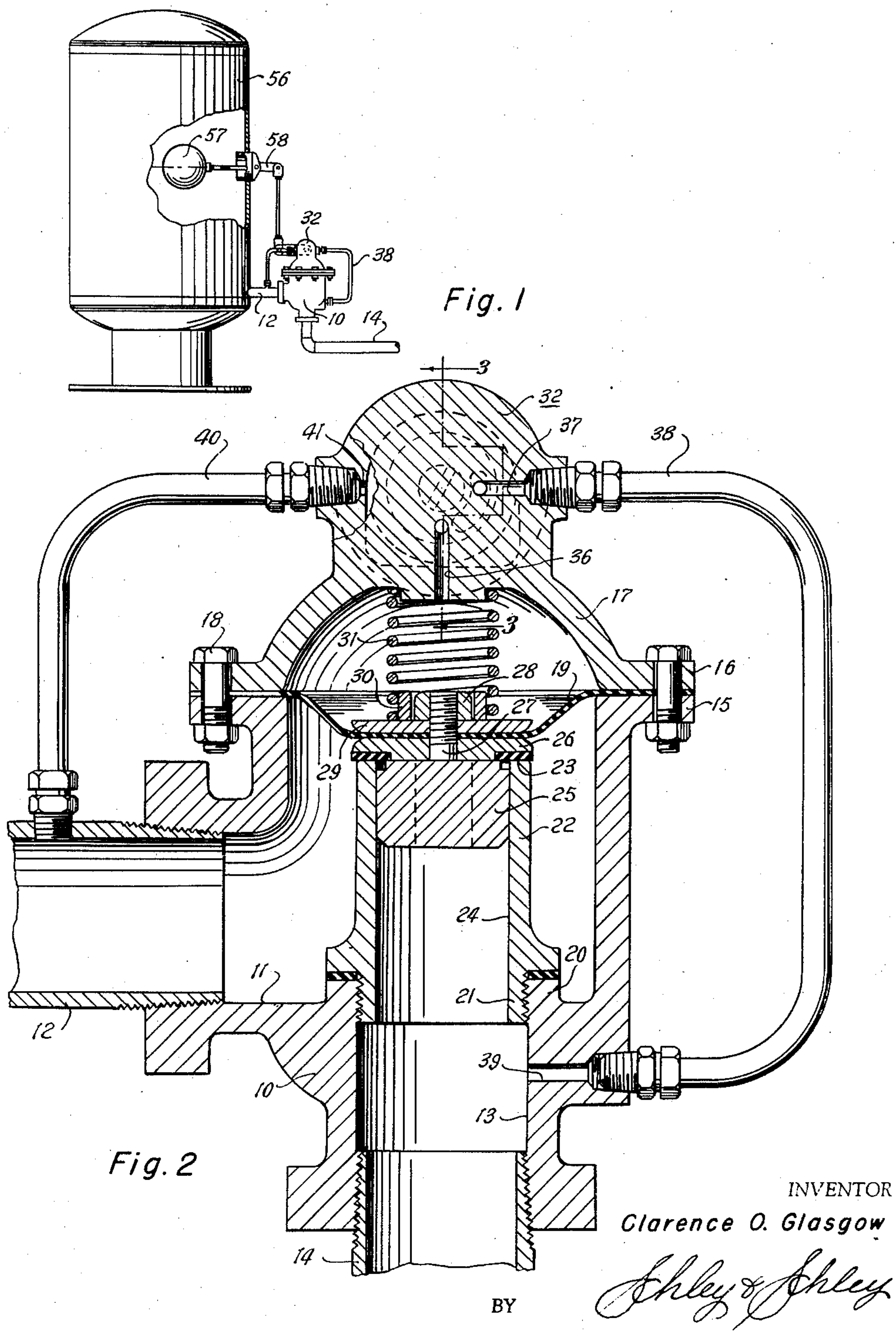

Oct. 7, 1958 C. O. GLASGOW 2,854,994

PILOT-OPERATED VALVES

Filed Oct. 15, 1956 2 Sheets-Sheet 1

INVENTOR
Clarence O. Glasgow

BY Ashley & Ashley

ATTORNEYS

Oct. 7, 1958 C. O. GLASGOW 2,854,994

PILOT-OPERATED VALVES

Filed Oct. 15, 1956 2 Sheets-Sheet 2

INVENTOR
Clarence O. Glasgow

BY Ashley & Ashley

ATTORNEYS

United States Patent Office 2,854,994

Patented Oct. 7, 1958

1

2,854,994

PILOT-OPERATED VALVES

Clarence O. Glasgow, Tulsa, Okla., assignor to National Tank Company, Tulsa, Okla., a corporation of Nevada Application October 15, 1956, Serial No. 615,832

6 Claims. (Cl. 137—414)

This invention relates to new and useful improvements in pilot-operated valves.

There are currently in use many float or liquid level operated valves which depend upon the buoyancy of a float or other member for opening and closing the valve to drain liquids from a tank, vessel, or other enclosure as the liquid level rises and falls therein. Such valves are relatively simple in structure and are easily connected into the discharge line from a vessel or enclosure, but have the disadvantage that only the buoyancy or the weight of the float element is available to supply force for opening the valve or for holding the same in a closed position. There are also power- operated valves in which the float element controls a small pilot valve, the pilot valve in turn controlling the supplying of an actuating gas under pressure to the operating diaphragm of a motor valve, or for exhausting pressure therefrom. The latter type of valve has a much more positive opening and closing action than valves directly operated by a float, but they entail the use of considerable additional equipment which increases both the expense of the valve arrangement as well as the complexity thereof. Of course, the more complex a structure becomes, the more difficult it is to install, the greater opportunity for incorrect installation, and the greater opportunity for malfunctioning or failure of the various component elements.

It is, therefore, the principal object of the invention to provide an improved valve structure having the simplicity and economy of a directly-actuated valve while realizing the positive opening and closing action of a pilot-operated valve and the considerable forces or pressure available for moving the valve core toward and away from its seat in the latter type of valve.

It is a further object of this invention to provide an improved valve structure which reaps the various advantages of a pilot-operated valve while elminating the need for a separate pilot valve structure, for pressure gas regulators, pressure gauges, and various connecting pipes or conductors now required for conventional pilot-operated valves.

It is a still further object of the invention to provide an improved valve having a spring-biased operating diaphragm, and having means for applying the full internal pressure of the vessel to which the valve is connected, to selected portions of the diaphragm for positive opening or closing of the valve in accordance with the liquid level within said vessel.

Yet another object of the invention is to provide a valve for the discharge of fluids from vessels, the valve including within its own structure a float-operated pilot valve for controlling and directing the communicating of pressure upstream and downstream of the main valve to a diaphragm therewithin for opening and closing said main valve.

A construction designed to carry out the invention will be hereinafter described, together with other features of the invention.

2

Figure 3:
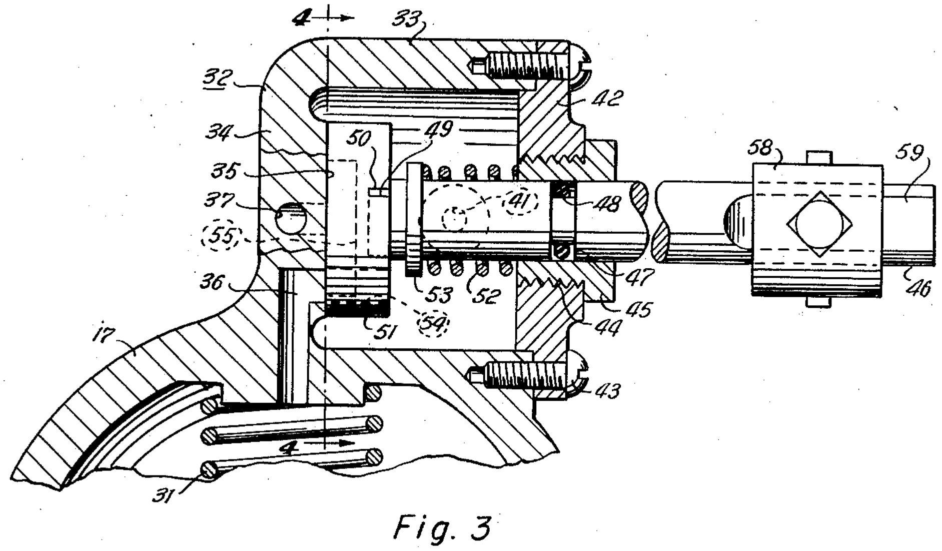
Figure 4:
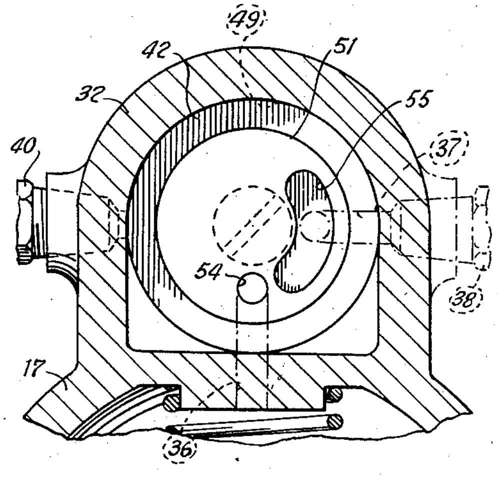
Figure 5:
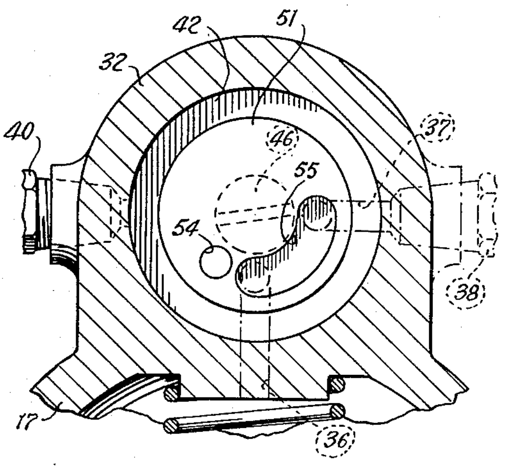

The invention will be more readily understood from a reading of the following specification and by reference to the accompanying drawings, wherein an example of the invention is shown, and wherein:

Fig. 1 is a view in elevation of a tank or vessel having connected thereto a valve constructed in accordance with this invention, Fig. 2 is a vertical, sectional view of the valve, Fig. 3 is a vertical, sectional view taken upon the line 3—3 of Fig. 2, Fig. 4 is a vertical, sectional view taken upon the line 4—4 of Fig. 3, showing the pilot valve in position for closing of the main valve, elements in front of the plane of view being shown in dotted lines, and Fig. 5 is a view similar to Fig. 4 showing the pilot valve in position for opening of the main valve.

In the drawings, the numeral 10 designates an approximately T-shaped valve housing having a laterally-directed, screw-threaded inlet passage 11 receiving an inlet pipe or conductor 12, and a downwardly-directed, screw-threaded outlet passage 13 receiving an outlet pipe 14. The upper end portion of the housing is open and provided with a radially outwardly extending flange 15 receiving the mating flange 16 of a domed cover plate 17. Suitable bolts and nuts 18 join the flanges 15 and 16 together with the periphery of a flexible diaphragm 19 clamped therebetween. Within the hollow interior of the valve housing 10, there is provided a short, upstanding, internally screw-threaded collar 20 which receives the screw-threaded pin 21 formed on the lower end of an upstanding sleeve 22. The sleeve 22 is tubular, and its upper end forms a valve seat 23 communicating through the bore 24 of the sleeve with the outlet passage 13.

A guide spider 25 has a loose sliding fit within the upper portion of the bore 24 and clamps a valve disk 26 to the lower side of the diaphragm 19 by means of a screw-threaded stem 27 extending upwardly through the disk 26 and the diaphragm 19, and receiving a locking nut 28 upon its upper end. A suitable plate or disk 29 is clamped between the underside of the nut 28 and the upper side of the diaphragm 19 and functions to distribute thrust loads over an area of the diaphragm in the usual manner. A flanged ring 30 is positioned around the nut 28, and a compression spring 31 is confined between the flange of the ring 30 and the upper wall of the dome 17 so as to urge the valve disk 26 and the diaphragm 19 constantly downwardly toward the valve seat 23. The structure thus far described is largely conventional in nature and arrangement, and, obviously, much variation thereof may occur.

A pilot valve case 32 is formed integrally of the upper portion of the cover plate 17 and has a generally cylindrical conformation with the axis of the cylinder extending at right angles to the vertical axis of the valve structure. Thus, the casing includes a substantially cylindrical side wall 33 and a closed bottom wall 34 with its diameter disposed approximately in the vertical axis of the valve housing 10, while the opposite side of the pilot valve case is open. A smoothly finished valve face 35 is formed on the inner side of the closed bottom 34 of the pilot valve case, and a pressure fluid outlet passage 36 extends upwardly from the interior of the cover plate 17 into the closed bottom 34 of the pilot valve case, and then at right angles to the valve face 35. Similarly, a pressure fluid inlet passage 37 extends laterally or horizontally into the closed bottom 34 of the pilot valve case and then opens at right angles through the face 35. The passages 36 and 37 open through the face at points spaced approximately ninety degrees from one another, and desirably, the passage 37 extends into the pilot valve case from that side thereof opposite the inlet passage 11 of the valve housing 10.

A pressure fluid conductor 38 is connected between the passage 37 and a passage 39 opening into the outlet passage 13 of the valve housing below the collar 20, and thus transmits to the passage 37 at all times whatever pressure may be existent within the passage 13 and the outlet conductor 14. A similar pressure fluid conductor 40 is connected between the inlet pipe 12 and a port 41 opening into the interior of the pilot valve case 32 through the side wall 33 thereof. Quite obviously, the conductors 38 and 40 may be replaced by passages cast or otherwise formed in the walls of the housing 10, the cover plate 17, and the pilot valve case 32, or any other suitable means may be employed for constantly communicating the pressures within the inlet and outlet conductors 12 and 14 to the interior of the pilot valve case 32 and the passage 37, respectively.

A cover 42 is secured to the open side of the valve case 32 by suitable screws 43, and is provided with a central, screw-threaded bore 44 receiving a screw-threaded bushing 45. An actuating shaft 46 extends from the exterior of the case 32 through the bushing 45 and is provided with an annular groove 47 within the bushing and receiving a sealing O-ring 48 for closing off the space between the shaft 46 and the bushing.

The inner end of the shaft 46 is provided with a transverse rib or key 49 engaging in the transverse slot 50 formed upon the outer face of a valve disk 51 which engages the valve face 35. A compression spring 52 is confined between the inner end of the bushing 45 and an external annular shoulder 53 formed on the shaft 46 near its inner end, and constantly urges the shaft and the valve disk 51 inwardly toward the valve face 35. That face of the disk 51 engaging the face 35 is ground or smoothly finished in a manner similar to that employed for the face 35, and hence, the abutting faces form a substantially fluid-type joint.

A port 54 extends through the thickness of the disk 51 near one edge thereof and is adapted to be moved into and out of registry with the passage 36 as the disk 51 is rotated against the face 35. The disk is also provided in its inner face with an arcuate groove 55 near one margin of the disk and spaced slightly from the port 54, the groove 55 constantly overlying and being in registry with the passage 37, and being of such length as to move into registry with the passage 36 when the disk 51 is shifted or rotated to move the port 54 out of registry with said passage 36. Thus, in one position of the valve disk 51 (Fig. 4), the inlet pipe 12 is in communication with the upper side of the diaphragm 19 through the conductor 40, the port 41, the interior of the pilot valve case 32, and the port 54. In this position of the valve, the outlet conductor 14 is shut off from communication with the passage 36. In the other position of the pilot valve (Fig. 5), when the valve disk 51, as viewed in Fig. 2, has been rotated clockwise, the inlet conductor 12 is shut off from communication, and the outlet conductor 14 is exposed to the upper side of the diaphragm 19 through the passage 39, the conductor 38, the passage 37, and the groove 55.

Although the illustrated and described valve has many uses, it is particularly adapted to the controlled discharge of liquids from an oil and gas separator or other vessel within which fluids accumulate from time to time. Thus, as shown in Fig. 1, the inlet conductor 12 may extend to the bottom portion of an oil and gas separator or other liquid accumulation vessel 56 having therein a liquid level responsive element such as the float 57 adapted to move the float arm 58 up and down externally of the vessel 56. The operating shaft 46 may be provided with a key face 59 for direct attachment thereto of the arm 58, or secondary arms and links may be employed as is quite usual and customary in this type of structure.

It is desirable to discharge accumulated liquid from the vessel 56 as it is collected therein, and accordingly, the float 57, which responds to the liquid level within the vessel 56, is adapted to shift the pilot valve structure between its two positions to open or to close the subject valve structuref or discharge of liquid from the vessel.

In the position of the pilot valve shown in Figs. 2 and 4, the interior of the inlet conductor 12 is exposed to the upper side of the diaphragm 19, and accordingly, whatever pressure is present within the vessel 56 is communicated through the pipe 12 to the upper side of the diaphragm to force the valve core 26 downwardly upon the seat 23. The marginal portion of the lower side of the diaphragm is also subjected to this pressure, but obviously, the greater area of the upper side of the diaphragm exposed to the vessel pressure is sufficient to maintain the valve closed. Further, the spring 31 aids in forcing the valve core against the valve seat.

In such installations, the pressure in the outlet or discharge conductor 14 is low or near atmospheric, or in some cases is less than atmospheric. Accordingly, the balance of pressural forces in this position of the pilot valve are such as to force the valve into a closed position.

Now, however, as liquid accumulates in the vessel 56 and the float 57 is elevated, the shaft 59 will be revolved in a clockwise direction, as viewed in Fig. 2, to the position shown in Fig. 5, the port 54 will be moved from alinement with the passage 36, and the groove 55 will be brought into registry with the passage 36. Now, the pressure existent within the inlet conductor 12 is excluded from the upper side of the diaphragm 19, and instead, the entire upper surface of the diaphragm is exposed to the pressure existent within the outlet pipe 14 while the marginal portion of the bottom side of the diaphragm 19 continues to be exposed to the pressure in the inlet pipe 12. Normally, these pressures differ quite considerably and the force exerted upon the under side of the diaphragm 19 by the pressure within the vessel 56 and the inlet conductor 12 is sufficient to force the valve core 26 from the seat 23 and cause the valve to open. This open condition will, of course, continue until such time as the liquid level within the vessel 56 has dropped, the float 57 has been lowered, and the pilot valve has been returned to the position shown in Fig. 4.

The structure employs the pressures existent within the inlet and outlet pipes for the valve to open and close, is virtually as simple as a valve operated through a direct linkage to a liquid level float, and yet, has the quite considerable opening and closing forces made available through the application of differential pressures upon the relatively large diaphragm 19. Diaphragm-operated valves are widely used in such installations for this very reason, but such valves require the employment of pressure gas conductors, pressure reducing regulators, pressure gauges, and separate pilot valves which must be properly mounted and connected for application of pressure gas to the actuating diaphragm of the valve and exhaust of such pressure gas therefrom. The present invention reaps all the benefits of a diaphragm-operated valve by utilizing the pressures available thereto, and at the same time, is simple, compact, and unitary in structure, is easily installed and connected, and may be coupled directly or substantially directly to the operating arm 58 of the float 57. It is also pointed out that the valve core 26 is carried only by the diaphragm 19 and hence may undergo considerable tilting in order to conform to the valve seat 23 whereby a positive and effective closing of the valve is assured even when the sleeve 22 or the valve face 23 is not disposed precisely at right angles to the vertical axis of the valve housing 10. Further, in most instances, some liquid will work its way from the inlet conductor 12 into the interior of the pilot valve case 32 so as to lubricate the surfaces of the valve face 35 and the valve disk 51, as well as to insure an effective and fluid-tight seal therebetween.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A valve including a valve housing having an inlet and an outlet, a valve seat in the housing, a valve core in the housing for engaging the seat to isolate the inlet from the outlet, a two-sided pressure-responsive means in the housing carrying the valve core responsive to pressure applied on its first side to move the core toward the valve seat and responsive to pressure on its second side to move the core away from the valve seat, a pilot valve carried by the housing having passages for placing the first side of the pressure-responsive means in communication with the valve housing inlet in one position of the pilot valve and for placing the first side of the pressure-responsive means in communication with the valve housing outlet in another position of the pilot valve, the second side of the pressure-responsive means being exposed to the valve housing inlet, and an operating connection extending externally of the pilot valve for shifting the pilot valve between said two positions.

2. A valve including, a valve housing having an inlet and an outlet, a valve seat in the housing, a valve core in the housing for engaging the seat to isolate the inlet from the outlet, a diaphragm in the housing above the valve seat and carrying the valve core, the lower side of the diaphragm being exposed to the valve housing inlet, a pilot valve carried by the valve housing having passages for exposing the upper side of the diaphragm to the valve housing inlet in one position of the pilot valve and for exposing the upper side of the diaphragm to the valve housing outlet in a second position of the pilot valve, and an operating connection extending externally of the pilot valve for shifting the pilot valve between said two positions.

3. A valve including, a valve housing having an inlet and an outlet, a valve seat in the housing, a valve core in the housing for engaging the seat to isolate the inlet from the outlet, a diaphragm in the housing above the valve seat and carrying the valve core, the lower side of the diaphragm being exposed to the valve housing inlet, a three-way pilot valve carried by the valve housing having an outlet port exposed to the upper side of the diaphragm and two inlet ports exposed to the valve housing inlet and outlet respectively, and an operating connection extending externally of the pilot valve for shifting the pilot valve and placing the two inlet ports in communication alternately with the outlet port for opening and closing the valve.

4. A float-operated valve including, a valve housing having an inlet and an outlet, an upwardly-facing valve seat in the housing, a diaphragm in the housing above the valve seat, a valve core carried by the diaphragm for engaging the seat to isolate the inlet from the outlet, a spring constantly urging the diaphragm and valve core toward the valve seat, a three-way pilot valve carried by the valve housing having an outlet port exposed to the upper side of the diaphragm and two inlet ports exposed to the valve housing inlet and outlet respectively, and an operating connection extending externally of the pilot valve for connection to a liquid level float for shifting the pilot valve and placing the two inlet ports in communication alternately with the outlet port for opening and closing the valve.

5. A float-operated valve as set forth in claim 4, wherein the pilot valve includes a case having a laterally-directed internal valve face, and a valve disk engaging said face, the inlet and outlet ports of the pilot valve being in communication through said disk and face, and the disk being connected to the operating connection.

6. A float-operated valve as set forth in claim 4, wherein the pilot valve includes a case having a laterally-directed internal valve face, and a valve disk engaging said face, the outlet and one inlet port of the pilot valve leading to the valve face, the other inlet port leading to the interior of the pilot valve case, the valve disk having a groove exposing the outlet port to the first inlet port in one position of the disk and a passage exposing the outlet port to the other inlet port in a second position of the disk, and the disk being connected to the operating connection.

References Cited in the file of this patent

UNITED STATES PATENTS 1,296,206 Morali ---------------- Mar. 4, 19